United States Patent [19]

Needham, Jr.

[11] 3,724,964
[45] Apr. 3, 1973

[54] MULTIPLE STOP FOR POWER TOOLS

[76] Inventor: Andrew W. Needham, Jr., 141 E. 3350 S., Salt Lake City, Utah 84115

[22] Filed: Jan. 22, 1971

[21] Appl. No.: 108,776

[52] U.S. Cl..................408/14, 408/16, 82/34 D, 29/65
[51] Int. Cl. ..........................................B23b 49/00
[58] Field of Search .......408/14, 16; 82/34 D; 29/65; 90/51

[56] References Cited

UNITED STATES PATENTS

| | | | |
|---|---|---|---|
| 1,231,946 | 7/1917 | Schellenbach | 82/34 D |
| 2,361,453 | 10/1944 | Casella | 29/65 X |

*Primary Examiner*—Francis S. Husar
*Attorney*—Edward E. McCullough

[57] ABSTRACT

A shaft having a rotatable stop collar carrying adjustable stops is provided for a power tool, such as a drill press; it moves with the cutting tool, the stops being selectively registrable, optionally through an intermediate actuator, to bear against a stationary portion of the machine and/or an electrical limit switch for regulating depth of cut produced by the cutting tool.

15 Claims, 11 Drawing Figures

INVENTOR.
ANDREW W. NEEDHAM JR.
BY
Edward E. McCullough
AGENT

INVENTOR.
ANDREW W. NEEDHAM JR
BY
*Edward E. McCullough*

AGENT

INVENTOR.
ANDREW W. NEEDHAM JR.
BY

Edward E. McCullough

AGENT 3,724,964

MULTIPLE STOP FOR POWER TOOLS

BACKGROUND OF THE INVENTION

This invention relates to automatic stop means for power tools. In particular, it relates to precision, multiple stops, attachable to a power tool, that may be quickly selected and adjusted to regulate depth of cut in a work piece.

Although there are a number of devices in the prior art that are applicable to power tools, such as drill presses, for regulating the depth of cut produced by the cutting tool, no such device was found that could provide a selection of stops and that would be satisfactory for use with a modern drill press. For example, U. S. Pat. No. 971,679 to Kirby shows a multiple stop apparatus, but it is quite specifically applicable to a now obsolete type of drill press. Such stop means operate through linkages and arcuate motions that are not compatible with present day requirements for precision. They also teach the use of shoulder pins that fit into holes in a carrier as the stop means, which is further lacking in precision because of the possibility of foreign material becoming lodged between the shoulders of the pins and the carrier.

Other patents, such as a U. S. Pat. No. 2,110,537 to H. E. Tautz and U. S. Pat. No. 2,490,307 to M. J. Karr, show single stop means for drill presses, but do not show how these can be adapted to multiple stop apparatus.

SUMMARY OF THE INVENTION

The present invention, which has been developed to satisfy the need for a precision, multiple stop means for power tools is an appliance that may be attached to a power tool, such as a drill press, lathe, or milling machine. Alternatively, it may be incorporated as an integral part of the original machine. A shaft, attachable to a movable, cutting tool portion of a machine, has a rotatable collar carrying adjustable stops that may bear against some stationary part of the machine. The stops may also bear against an intermediate piece or sliding actuator that serves to operate a limit switch to cut off electrical power to the machine. By this means, depth of cut may be precisely regulated in a work piece.

Objects of the invention are to provide a means for precision control of depth of cut that is easily attachable to, or incorporated in, power tools and that offers rapid selection of any one of a variety of stops.

Important features of the invention are that it is simple and reliable in construction, and that it effects positive stops involving no motions in any direction other than that in which the cutting tool moves.

Other objects and advantages of the invention will become apparent as the following detailed description is read with reference to the accompanying drawings, wherein the same parts are designated by identical characters throughout the disclosure.

DESCRIPTION OF THE PREFERRED EMBODIMENTS

Figure 4:
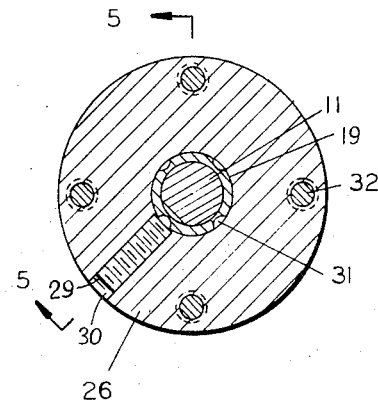
FIG. 4 is a cross section taken on line 4—4 of FIG. 2.
Figure 5:
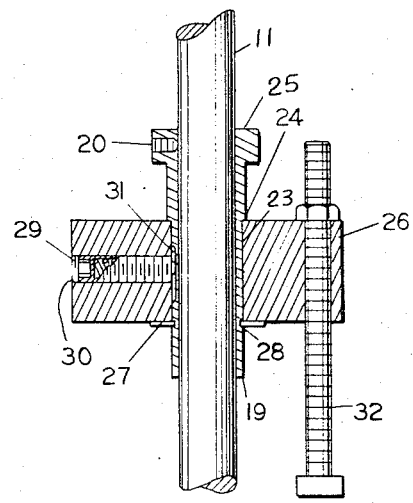
FIG. 5 is a full, longitudinal section taken on line 5—5 of FIG. 4.

Although the invention is applicable generally to power tools having movable cutting bits, the preferred embodiment shown in the accompanying figures is attachable to a typical drill press 10. A shaft 11 is joined in parallel relationship to a somewhat smaller diameter rod 12 by a yoke 13, forming a U-shaped member. Both the shaft 11 and the rod 12 have smaller diameter threaded portions at one end, forming shoulders 14 and 15, respectively. These threaded portions are inserted into holes in the yoke 13, which is then confined between the shoulders 14 and 15 and nuts 16. The shaft 11 and rod 12 could be fastened to the yoke by other means, such as threaded engagement in the yoke itself without the nuts 16, or at least the shaft 11 could be fastened by welding. A portion 17 of the movable carriage of the drill press, which carries the cutting bit 18 in vertical directions, is confined between the shoulder 15 of the rod 12 and the yoke 13, so that the invention is carried in vertical directions with the cutting bit 18. Hence, the shoulder 15, its threaded portion and corresponding nut 16 are attachment means for fastening the U-shaped member to the drill press. A sleeve 19 is fitted onto the shaft 11 and held immobile thereon by the set screw 20. The sleeve 19 has a smaller diameter portion 23, forming a shoulder 24; and it may also have a thickened portion 25 to accommodate the set screw 20. A rotatable stop collar 26 is confined on the sleeve 19 between the shoulder 24 and a snap ring 27 that fits into an annular groove 28 in the sleeve 19. It may be noted that this combination of sleeve 19, its should 24, snap ring 27 and set screw 20 comprise means of adjustably fixing the longitudinal position of the stop collar 26 on the shaft 11. A spring-loaded ball catch 29 is threadedly engaged in a radially oriented hole 30 in the collar 26, so that the ball thereof is biased inwardly and may engage any one of a plurality of indentations 31 that are circumferentially spaced about the sleeve 19 (FIGS. 4 and 5). A plurality of stops 32 are carried by the collar 26 and are adjustable thereto in a direction parallel to the travel of the drill bit 18. In the embodiment of the invention shown, they are screws engaged in threaded holes in the collar 26, for easy and positive vertical adjustment. An actuator 33 having the general form of a body with a hole therethrough is built on a bushing 34 for sliding engagement on the rod 15. Its upper surface includes a precision bearing surface 35 on a projection 36 and an under surface is a cam surface 37 on an opposite projection 38. A pointer 39, that may operate relative to the scale 40 on the drill press, is fixed to the shaft 11 by a small collar 41 having a set screw 42.

In operation of the invention, the operator first lowers the drill bit 18 until it touches the workpiece, not shown, and adjusts the pointer 39 until it registers with zero on the scale 40. He then places the sliding actuator 33 in contact with the stationary portion 43 of the drill press 10, through which the rod 12 extends. Removing the workpiece from under the drill bit 18, he rotates a selected stop 32 into alignment with the bearing surface 35 of the sliding actuator 33, raises that stop until its lower end is flush with the under surface of the collar 26, and loosens the set screw 20 in the sleeve 19. Then, lowering the carriage of the drill press 10 until the pointer 39 indicates somewhat more on the scale 40 than the depth of the deepest hole he intends to make, he tightens the setscrew 20. This insures that the collar 26 is sufficiently high on the shaft 11 to permit the amount of travel needed for all holes. He then lowers the carriage of the drill press 10 until the pointer 39 indicates the precise depth of the desired hole, and adjusts the selected stop 32 until it contacts the bearing surface 35. Rotating the collar 26, this procedure is preformed with as many of the stops 32 as are needed for automatic determination of holes of different depths. The indentations 31 in the sleeve 19 are spaced relative to the ball catch 29 and the stops 32 so that the stops 32 may be quickly and selectively brought into exact alignment with the bearing surface 35 of the sliding actuator 33.

Figure 2:
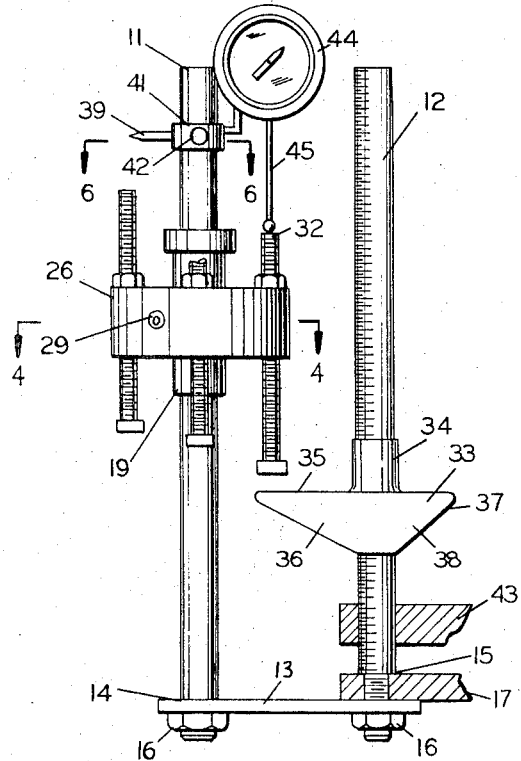
FIG. 2 is a side elevation of the invention, showing only fragments of the machine to which it is attached.
Figure 6:
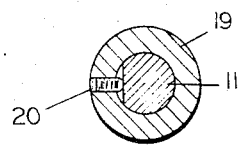
FIG. 6 is a cross section taken on line 6—6 of FIG. 2.
Figure 8:
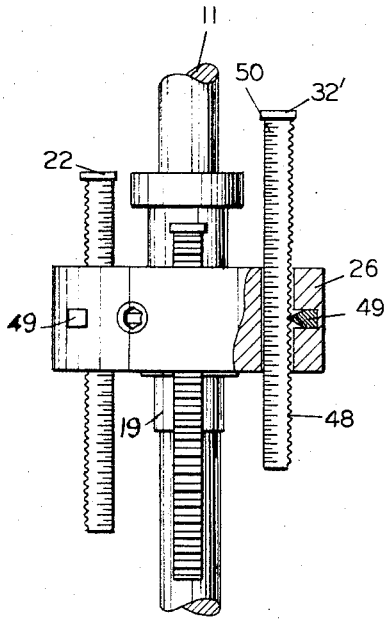
FIG. 8 is a fragmentary section showing the stop of FIG. 7 in side elevation.

If considerable precision is desired in the hole depths regulated by the stops 32, a dial micrometer 44 may be fixed to the pointer 39 so that its plunger 45 may contact each stop 32 as it is brought into alignment with the bearing surface 35. In FIG. 2, the micrometer is shown fixed to the small collar 41. The portion of the shaft 11 under the set screw 42 is flattened to prevent rotation of the collar 41 thereon, so that the pointer 39 and the micrometer plunger 45 may not be rotated out of alignment with the scale 40 and the selected stop 32, respectively (FIG. 6).

When the operator wishes to drill, he rotates the selected stop 32, representing the desired hole depth, into alignment with the bearing surface 35, turns on the machine, and lowers the drill bit 18 into the workpiece. When the appropriate depth has been reached, the stop 32 will contact the bearing surface 35 of the sliding actuator 33 and will then force the actuator 33 against the stationary portion 43 of the drill press to achieve a mechanical stop. The cam surface 37 will simultaneously be forced against the limit switch 46, to achieve shutoff of electrical power to the machine.

It is important to note that, after the appropriate stop 32 has been selected and rotated into a position of alignment with the bearing surface 35, the only motions permitted for the parts of the invention are in the direction of translatory motion of the drill bit 18. Hence, there are no rotations of parts or components of motion in any other direction to impair the precision with which hole depths may be determined.

Figure 3:
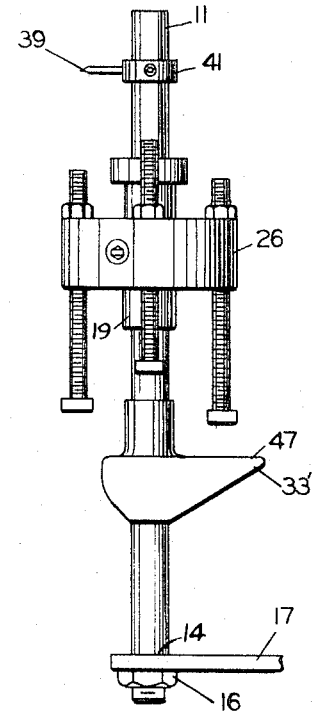
FIG. 3 is a view similar to FIG. 2 showing a simplified version thereof.

FIG. 3 shows a modification of the invention wherein the rod 12 is eliminated, as is the yoke 13. For certain drill presses, the shaft 11 can be attached directly to the portion 17 of the movable carriage. In this modification, the actuator 33 has a somewhat different form and is labeled 33'. It slides on the shaft 11 in much the same manner as the actuator 32 slides on the rod 12 in the previous embodiment. However, the bearing surface of the actuator 33' is on a long arm 47, which also serves to operate the limit switch 46. Otherwise, all parts are identical to those of FIG. 2 and function in the same manner.

Figure 7:
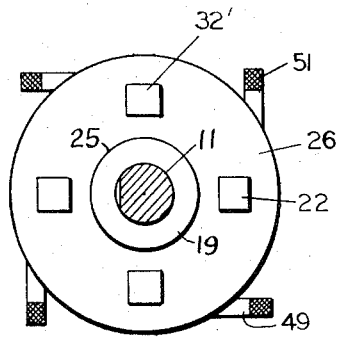
FIG. 7 is a fragmentary section showing a second species of stop.

FIGS. 7 and 6 illustrate an alternate embodiment for the stops 32, and are labeled 32'. In this embodiment, the stops 32' may be quickly set by increments determined by small serrations 48 on the side of the stop member 32'. These serrations or teeth are engaged by a slide member 49, which is tapered somewhat in a longitudinal direction so that, as it is pressed inwardly, it may be wedged tightly between chosen teeth 48. A scale 50 may also be included on this stop for ready indication of adjustment relative to the upper surface of the collar 26. A knurled knob 51 assists in withdrawing and engaging the slide member 49. The stop 32' is non-circular in cross section to prevent its rotation relative to the collar 26, and a small head 22 on the top end prevents its falling through the hole in the collar 26 when not engaged by the slide 49.

Figure 9:
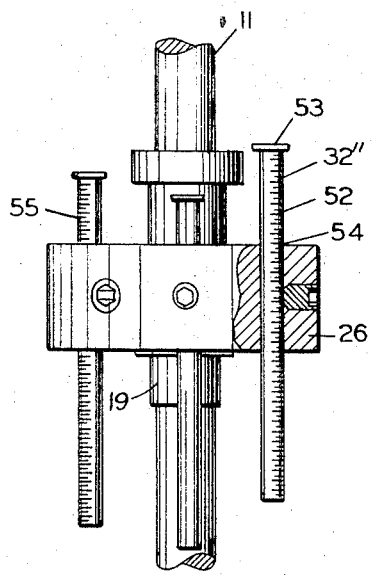
FIG. 9 is a view similar to FIG. 8 showing a third species of stop.

FIG. 9 shows a third embodiment of the stop 32, here labeled 32". This stop member 32" is a plain rod 52 having a small head 53 on one end slightly larger in diameter to prevent its falling through the unthreaded hole 54 in the collar 26. A set screw, threadedly engaged in the edge of the collar 26 and radially oriented to bear against the stop 32", can fix its position quickly once it is determined. The stop 32" may also have a scale 55 on it for the same purpose as has been described for that on the stop 32'.

It is sometimes helpful to have combinations of these different types of stops in the same collar 26. For example, although the threaded stops 32 can be adjusted with precision, the stops 32' or 32" may be adjusted very rapidly, even though the hole depths to be regulated thereby may vary greatly.

Figure 1:
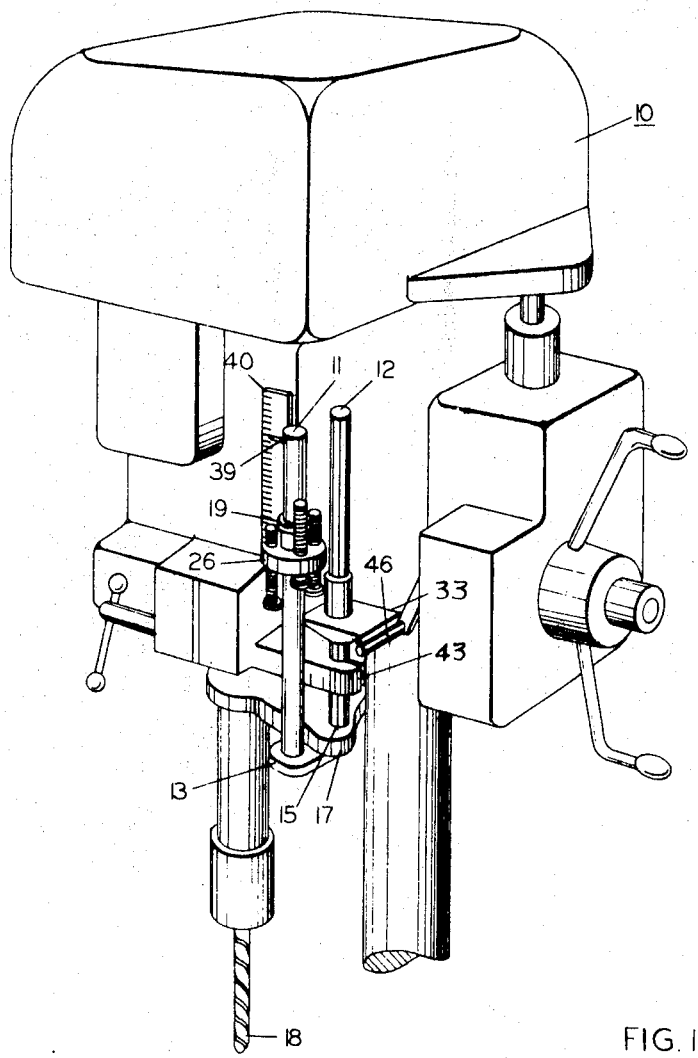
FIG. 1 is a perspective view of a portion of a typical drill press equipped with the invention.
Figure 10:
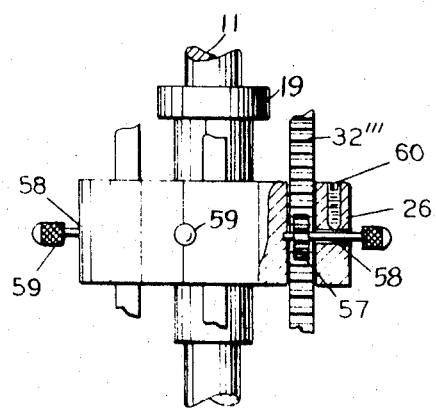
FIG. 10 is a fragmentary section showing a fourth species of stop.

FIG. 10 shows a fourth embodiment of the stop 32, here labeled 32'''. This stop is a rack gear that fits into a hole in the collar 26 in much the same manner as the other stops described. A pinion gear 57 on a shaft 58 meshes with the rack-gear stop in the collar 26. A knurled handle 59 on the and of the shaft 58, which extends radially through the collar 26, permits raising and lowering of the stop 32''' by rotation the handle This stop 32''' may be fixed in place by a set screw 60, which extends into the collar 26 from the edge thereof.

Figure 11:
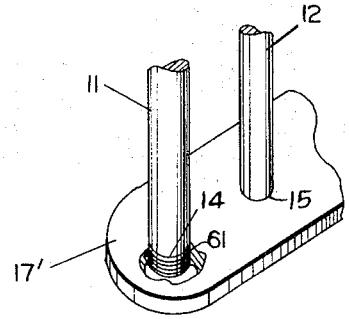
FIG. 11 is a fragmentary side elevation of the invention as an integral part of a drill press.

FIG. 11 shows how the invention may be incorporated as an integral part of a drill press. The projection portion 17' of the movable carriage is simply elongated to serve as a yoke and is provided with threaded holes 61 in which the shaft 11 and rod 12 are engaged. Otherwise, all parts are identical to those described with reference to FIGS. 1-6 and function in the same way. Lock washers, not shown may be used between the shoulders 14 and 15 and the modified carriage portion 17' to prevent rotation of the shaft 11 and rod 12.

An invention has been described that constitutes an advance in the art of machining with power tools. Although the descriptions of the preferred embodiments have been specific with regard to detail, it should be noted that many such details may be altered without departing from the scope of the invention as it is defined in the following claims.

The invention claimed is:
1. A multiple-stop apparatus for automatic control of the depth of cut in a workpiece, attachable to the movable cutting tool carriage of a power tool, having stationary parts including a bearing surface thereon, comprising:
- a shaft attachable to the cutting tool carriage parallel to the travel thereof;
- a rotatable collar on the shaft;
- means for restricting longitudinal movement of the collar on the shaft;
- a plurality of stops fastened to the collar and adjustable thereto in the direction of travel of the cutting tool carriage, the shaft being positioned relative to the stationary bearing surface of the power tool so that any of the stops may be selectively placed in alignment with the bearing surface by rotating the collar, so that abutment of the selected stop against the bearing surface restricts further movement of the carriage;
- pointer means; and
- a scale adjacent the pointer means and parallel to the travel of the carriage relative to a stationary part, the pointer means being fixed to one of these members and the scale being fixed to the other, whereby travel of the carriage relative to the stationary part may be measured.

2. The apparatus of claim 1 further including
a spring-loaded, ball catch fastened to the collar radially so that the ball thereof is urged inwardly toward the shaft, which has indentations into which the ball may be partially forced, to provide rotational stop means for the collar on the shaft, the number and spacing of the indentations relative to the ball catch and the adjustable stops being such as to bring any selected stop into alignment with the stationary bearing surface on the power tool, whereby such selective alignment may be quickly and accurately achieved.

3. The apparatus of claim 1 wherein the stops in the collar are screws engaged in threaded holes circumferentially spaced in the collar.

4. The apparatus of claim 1 wherein at least one stop is a rod, noncircular in cross section, that fits slidably into a hole of the same noncircular shape in the collar; and further includes serrations on one side of the rod; and an elongated slide member, having a wedge-shaped edge, slidably engaged in a slot extending into the collar from the edge thereof adjacent the serrations of the rod, whereby the stop may be adjusted incrementally by wedging the slide member between selected serrations thereon.

5. The apparatus of claim 4 wherein the stop has an enlarged head at the top end thereof, so that it cannot fall through its hole in the collar when the slide member is withdrawn, and wherein the stop has a scale imprinted thereon for measuring its against the stop, relative to the stop may surface of the over a collar.

6. The apparatus of claim 1 wherein at least one stop is a rod, slidably engaged in a hole in the collar; and further includes a set screw, radially oriented and threadedly engaged in the collar from the edge thereof so that it may bear against the stop, whereby the stop may be quickly adjusted over a wide range of hole depths.

7. The apparatus of claim 4 wherein the stop has an enlarged head at the top end thereof, so that it cannot fall through its hole in the collar when the set screw is loosened, and wherein the stop has a scale imprinted thereon for measuring its adjustment relative to the upper surface of the stop collar.

8. The apparatus of claim 1 wherein at least one of the stops is a rack gear slidably engaged in a hole in the collar; and further includes a pinion gear radially oriented in the collar in mesh with the rack gear; and a handle centrally attached to the pinion gear and extending beyond the edge of the collar for rotating the pinion gear and adjusting the stop.

9. The apparatus of claim 1 including an arm slidably engaged on the shaft in keyed relationship therewith between the collar and the stationary bearing surface on the power tool and extending outwardly from the shaft and shaped to be always in alignment with the stationary bearing surface and a limit switch on the power tool, whereby both a mechanical stop and a power shutoff may be achieved.

10. The apparatus of claim 1 including:
- a second collar on the shaft;
- means for preventing longitudinal and rotational movement of the second collar on the shaft; and
- a plunger-type micrometer fixed to the collar, the plunger being oriented to contact any one of the stops selectively as the stop collar is rotated on the shaft, whereby adjustment of the selected stop may be accurately measured.

11. The apparatus of claim 1 further including a rod having threads on one end, the threaded portion being of smaller diameter than the remainder of the rod to form a shoulder; a yoke having two holes therein to fasten the shaft and rod together in parallel relationship, the shaft also being threaded on one end similarly to the rod, and nuts to confine the yoke against said shoulders, and whereby a portion of the movable carriage of the power tool may be confined between the yoke and one of said shoulders; and
- an actuator having the form of a body with a hole through which the rod extends, so that the actuator may slide freely thereon, the upper surface of the actuator being a precision bearing surface on which the selected stop may bear, and the under surface being an actuating surface for operating a limit switch and for contacting the stationary portion of the drill press as the actuator is moved on the rod by the selected stop.

12. A multiple stop apparatus attachable to a drill press having a stationary portion and a movable carriage that holds a cutting tool, comprising:
- a U-shaped member formed by a shaft, a rod, and a yoke joining them together;
- attachment means for fastening the U-shaped member to the movable carriage of the drill press parallel to the travel thereof;
- a sleeve on the shaft, having circumferentially-spaced indentations therein;
- adjustment means for adjusting the longitudinal position of the sleeve on the shaft and fixing it in a desired position;

a stop collar rotatably positioned on the sleeve and having circumferentially spaced holes therein;

means for restricting the longitudinal position of the collar on the sleeve;

a spring-loaded ball catch radially oriented in the stop collar so that the ball thereof may be partially forced into a selected one of the indentations in the sleeve, as the collar is rotated;

a plurality of stops adjustably engaged in the holes in the collar in a direction parallel to the shaft; and a sliding actuator having the form of a body with a hole therethrough on the rod between the stop collar and the stationary portion of the drill press, portions of the actuator being simultaneously alignable with a selected stop and with said stationary portion, whereby a positive mechanical restraint will result as the stop approaches the stationary portion, to regulate the cutting depth in a work piece.

13. The multiple stop apparatus of claim 12 wherein at least one of the adjustable stops in the stop collar has external screw threads and the hole in the collar in which it is engaged is also threaded, for positive engagement and adjustment of the stop therein.

14. In a drill press having a stationary portion and a movable carriage holding a drill bit, the improvement comprising:

a yoke fixed to the movable carriage and formed as a projection thereon;

a shaft fixed to the yoke and oriented parallel to the motion of the carriage;

a rod fixed to the yoke parallel to the shaft;

a rotatable stop collar on the shaft;

means for adjustably fixing the longitudinal position of the stop collar on the shaft;

a plurality of stops carried by the collar and adjustable thereto parallel to the motion of the carriage;

a sliding actuator on the rod, and having a bearing surface and an actuating surface thereon, the shaft and collar being positioned relative to the bearing surface of the actuator so that any one of the stops may be rotated into alignment therewith, and the actuator being in alignment with the stationary portion of the drill press, whereby depth of the drill bit in a work piece may be automatically determined.

15. The drill press of claim 14 further including:

an electric limit switch on the stationary portion thereof, and in alignment with the bearing surface of the sliding actuator, whereby electric power may be turned off when appropriate depth of cut has been achieved;

a scale on a stationary part of the drill press, arranged parallel to motion of the carriage; and a pointer on the shaft arranged to indicate positions on the scale.

* * * * *